(12) United States Patent
Stickelmaier et al.

(10) Patent No.: US 9,469,420 B2
(45) Date of Patent: Oct. 18, 2016

(54) SHAFT ASSEMBLY FOR ROTARY SWITCH

(71) Applicant: The Boeing Company, Chicago, IL (US)

(72) Inventors: John F. Stickelmaier, Manhattan Beach, CA (US); Dean A. Chin, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 14/258,954

(22) Filed: Apr. 22, 2014

(65) Prior Publication Data

US 2015/0303005 A1  Oct. 22, 2015

(51) Int. Cl.
| | |
|---|---|
| *H01H 19/10* | (2006.01) |
| *H01H 1/40* | (2006.01) |
| *H01H 19/50* | (2006.01) |
| *H01H 19/54* | (2006.01) |
| *H01H 19/56* | (2006.01) |
| *H01H 19/64* | (2006.01) |
| *H01H 9/00* | (2006.01) |
| *B64G 1/40* | (2006.01) |

(52) U.S. Cl.
CPC ............ *B64G 1/405* (2013.01); *H01H 1/40* (2013.01); *H01H 19/10* (2013.01); *H01H 19/50* (2013.01); *H01H 19/54* (2013.01); *H01H 19/56* (2013.01); *H01H 19/64* (2013.01); *H01H 2009/0088* (2013.01)

(58) Field of Classification Search
CPC ........ H01H 19/10; H01H 1/40; H01H 19/50; H01H 19/54; H01H 19/56; H01H 19/64; H01H 2009/0088; B64G 1/405
See application file for complete search history.

(56) References Cited

U.S. PATENT DOCUMENTS

| | | | | |
|---|---|---|---|---|
| 2,520,709 A | * | 8/1950 | Bitler ................... | H01H 19/56 200/19.19 |
| 2016/0122040 A1 | | 5/2016 | Stickelmaier et al. | |

FOREIGN PATENT DOCUMENTS

| | | |
|---|---|---|
| EP | 2735736 A2 | 5/2014 |
| WO | 20130343825 A1 | 3/2013 |

OTHER PUBLICATIONS

Extended European Search Report for EP Application No. 15191257.3 dated May 4, 2016.
Brophy, The Dawn Ion Propulsion System, Space Science Reviews, Nov. 16, 2011, pp. 251-261, Jet Propulsion Laboratory, Pasadena, CA.
Krauthamer, et al., Power Processing Units for High Powered Solar Electric Propulsion using MPD Thrusters, pp. 1,285-1,290, Jet Propulsion Laboratory, California Institute of Technology, Pasadena CA.
U.S. Appl. No. 13/664,635, filed Oct. 31, 2012.
U.S. Appl. No. 13/683,688, filed Nov. 21, 2012.

* cited by examiner

*Primary Examiner* — Phutthiwat Wongwian
*Assistant Examiner* — William Breazeal
(74) *Attorney, Agent, or Firm* — Kunzler Law Group, PC

(57) ABSTRACT

Described herein is a shaft assembly for a rotary switch that includes a shaft made from an electrically non-conductive material. The shaft includes at least one circumferential groove that has a generally T-shaped cross-section. The shaft assembly also includes at least one conductive ring segment made from an electrically conductive material positioned within the circumferential groove. The conductive ring segment has a generally T-shaped cross-section. Additionally, the shaft assembly includes a bonding adhesive that is positioned between the circumferential groove and the conductive ring segment.

25 Claims, 9 Drawing Sheets

SHAFT ASSEMBLY FOR ROTARY SWITCH

FIELD

This disclosure relates generally to rotary-type electrical switches, and more particularly to a shaft assembly for such a rotary switch.

BACKGROUND

Rotary switches are commonly used to selectively control electrical power or communications between electrical components. Selective control of a rotary switch is performed through rotation of a rotor or shaft. The shaft includes electrical contacts that rotate with the shaft. The rotary switch also includes electrical terminals that are stationary relative to the rotating shaft and electrically contactable with the electrical contacts of the shaft. As the shaft rotates, the electrical terminals come into and go out of contact with the electrical contacts to open and close, respectively, an electrical circuit formed by the rotary switch.

Often, rotary switches form part of an electrical system that receives electrical power from a power source and selectively transfers the power to an electrical device. The electrical system may include redundant power sources and/or redundant electrical devices. In such systems, the rotary switch can be selectively controlled to switch the source of power between redundant power sources and/or switch the receipt of power between redundant electrical devices.

SUMMARY

The subject matter of the present application has been developed in response to the present state of the art, and in particular, in response to the shortcomings of rotary switch for use with various systems, such as aircraft and spacecraft, which have not yet been fully solved by currently available techniques. Accordingly, the subject matter of the present application has been developed to provide an apparatus, system, and method that overcome at least some of the shortcomings of prior art techniques. More particularly, described herein is a shaft assembly of a rotary switch system that, in some embodiments, is more reliable, less expensive, and easier to manufacture than prior art shaft assemblies.

According to one embodiment, a shaft assembly for a rotary switch includes a shaft made from an electrically non-conductive material. The shaft includes at least one circumferential groove that has a generally T-shaped cross-section. The shaft assembly also includes at least one conductive ring segment made from an electrically conductive material positioned within the circumferential groove. The conductive ring segment has a generally T-shaped cross-section. Additionally, the shaft assembly includes a bonding adhesive that is positioned between the circumferential groove and the conductive ring segment.

In some implementations, the shaft assembly further includes at least one non-conductive ring segment made from an electrically non-conductive material. The non-conductive ring segment is positioned within the circumferential groove and has a generally T-shaped cross-section. The bonding adhesive is positioned between the circumferential groove and the non-conductive ring segment. The conductive ring segment and the non-conductive ring segment can be circumferentially spaced apart from each other. According to some implementations, the conductive ring segment is a first conductive ring segment, and the shaft assembly further includes a second conductive ring segment that is positioned within the circumferential groove and has a generally T-shaped cross-section. In yet some implementations, the non-conductive ring segment is a first non-conductive ring segment, and the shaft assembly further includes a second non-conductive ring segment that is positioned within the circumferential groove and has a generally T-shaped cross-section. The first and second non-conductive rings are positioned between the first and second conductive ring segments on substantially opposing sides of the shaft. According to certain implementations, shaft assembly includes an axial slot that extends transversely through the circumferential groove. The axial slot can be positioned between the conductive ring segment and the non-conductive ring segment.

According to some implementations of the shaft assembly, the shaft further includes a first pin receptacle formed in the circumferential groove. The conductive ring segment includes a pin that is configured to engage the first pin receptacle to circumferentially align the conductive ring segment within the circumferential groove. The shaft assembly may further include at least one non-conductive ring segment made from an electrically non-conductive material. The non-conductive ring segment can be positioned within the circumferential groove and have a generally T-shaped cross-section. The bonding adhesive is positioned between the circumferential groove and the non-conductive ring segment. The shaft can further include a second pin receptacle that is formed in the circumferential groove. The non-conductive ring segment includes a pin that is configured to engage the second pin receptacle to circumferentially align the non-conductive ring segment in a spaced-apart manner relative to the conductive ring segment.

In certain implementations of the shaft assembly, the shaft is made solely from the electrically non-conductive material to form a one-piece monolithic construction. The shaft can be machined from the electrically non-conductive material.

According to some implementations of the shaft assembly, the conductive ring segment includes a radially outer portion and a radially inner portion that extends transversely away from the radially outer portion in a radially inward direction to define the T-shaped cross-section of the circumferential groove. The circumferential groove includes a radially outer portion and a radially inner portion that extends transversely away from the radially outer portion of the circumferential groove to define the T-shaped cross-section of the circumferential groove. The radially outer portion of the conductive ring segment is positioned within the radially outer portion of the circumferential groove and the radially inner portion of the conductive ring segment is positioned within the radially inner portion of the circumferential groove.

In some implementations of the shaft assembly, a gap with a uniform thickness is defined between the circumferential groove and the conductive ring segment. The bonding adhesive may include bond-line control beads. Furthermore, the uniform thickness of the gap can be approximately equal to a diameter of the bond-line control beads.

According to certain implementations of the shaft assembly, the shaft includes a plurality of circumferential grooves spaced apart axially along the shaft. The shaft assembly includes a plurality of conductive ring segments each positioned within a respective one of the plurality of circumferential grooves. The shaft further includes a plurality of baffles positioned between the plurality of grooves, where the baffles each have a diameter greater than respective diameters of adjacent grooves. A first number of the plurality of conductive ring segments can include a high voltage section of the shaft assembly, and a second number of the plurality of conductive ring segments can include a low voltage section of the shaft assembly. A dividing baffle of the plurality of baffles may divide the high voltage section and the low voltage section, where the dividing baffle has an axial thickness greater than the other of the plurality of baffles. The shaft can further include a circumferential slot formed in the dividing baffle.

In some implementations, the shaft assembly can further include a first end cap that is bonded to a first end section of the shaft and a second end cap that is bonded to a second end section of the shaft. The first and second end caps can be made from a metal.

According to another embodiment, an electrical propulsion system includes a rotary switch assembly with first, second, third, and fourth electrical contacts and a shaft assembly. The shaft assembly includes a shaft machined from an electrically non-conductive material to form a one-piece monolithic construction. The shaft includes a circumferential groove with a generally T-shaped cross-section. The shaft assembly also includes two conductive ring segments each made from an electrically conductive material. Each conductive ring segment is adhesively bonded to the circumferential groove in a circumferentially spaced-apart manner. Furthermore, each conductive ring segment has a generally T-shaped cross-section. The shaft assembly additionally includes two non-conductive ring segments each made from an electrically non-conductive material. Each non-conductive ring segment is adhesively bonded to the circumferential groove circumferentially between the conductive ring segments. Further, each non-conductive ring segment has a generally T-shaped cross-section. The first, second, third, and fourth electrical contacts are electrically contactable with the conductive ring segments and the non-conductive ring segments via rotation of the shaft. The electrical propulsion system also includes a first power supply that provides power to the first electrical contact of the rotary switch assembly, a second power supply that provides power to the second electrical contact of the rotary switch assembly, a first propulsion system that receives power from the third electrical contact of the rotary switch assembly, and a second propulsion system that receives power from the fourth electrical contact of the rotary switch assembly. The shaft of the rotary switch assembly is rotatable to switch between first and second modes. The first mode, the rotary switch transmits electrical power from the first power supply to the first propulsion system and transmits electrical power from the second power supply to the second propulsion system. In the second mode, the rotary switch transmits electrical power from the first power supply to the second propulsion system and transmits electrical power from the second power supply to the first propulsion system.

In some implementations, the electrical propulsion system further includes a spacecraft. The rotary switch assembly, first power supply, second power supply, first propulsion system, and second propulsion system are coupled to the spacecraft.

According to another embodiment, a method for making a shaft assembly for a rotary switch includes forming a shaft made from an electrically non-conductive material where the shaft includes a circumferential groove having a T-shaped cross-section. The method also includes forming a conductive ring segment made from an electrically conductive material where the conductive ring segment has a T-shaped cross-section. Additionally, the method includes applying a bonding adhesive into the circumferential groove and positioning the conductive ring segment into the circumferential groove against the bonding adhesive.

In some implementations of the method, forming the shaft includes machining the shaft from a single ingot of electrically non-conductive material. According to yet some implementations of the method, positioning the conductive ring segment into the groove includes defining a uniformly thick gap between the conductive ring segment and the circumferential groove. In certain implementations of the method, forming the shaft includes forming a hole in the circumferential groove and forming the conductive ring segment includes coupling a pin to the conductive ring segment. Positioning the conductive ring segment into the circumferential groove may include inserting the pin into the hole. According to some implementations, positioning the conductive ring segment into the circumferential groove includes circumferentially and axially self-aligning the conductive ring segment within the circumferential groove.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
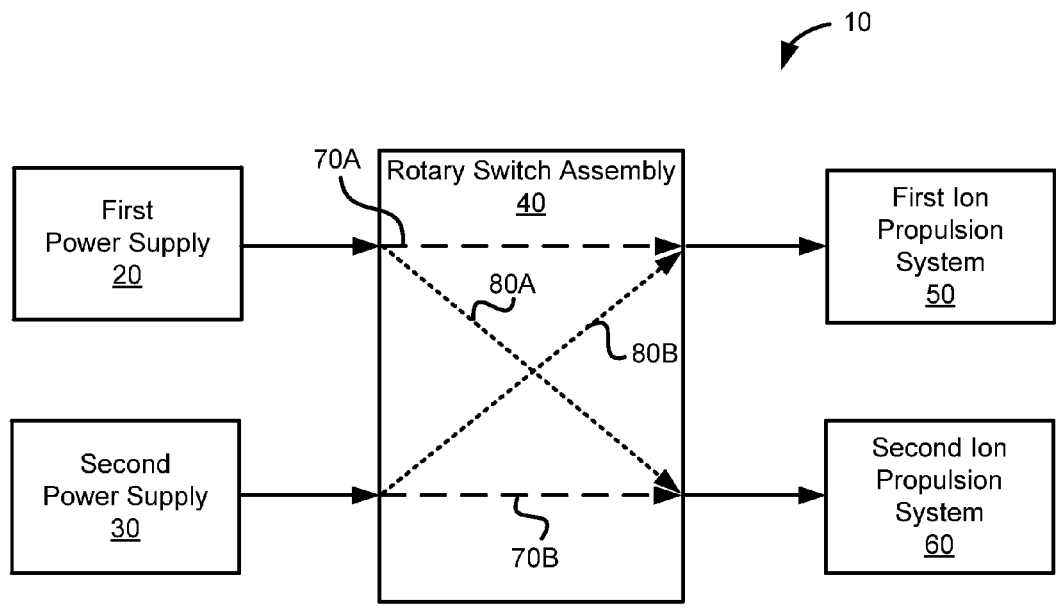
FIG. 1 is a schematic block diagram of an electrical system with a rotary switch according to one embodiment.

Referring to FIG. 1, one embodiment of an electrical system 10 includes first and second power supplies 20, 30, a rotary switch assembly 40, and first and second ion propulsion systems 50, 60. The electrical system 10 can form part of a mobile system or structure, such as an aircraft, spacecraft, automobile, and the like. In certain implementations, the electrical system 10 forms part of a satellite.

Generally, the electrical system 10 is configured to selectively supply electrical power to one or more electrical devices via the rotary switch assembly 40. In the illustrated embodiment, the electrical power is supplied from the first and second power supplies 20, 30, and the electrical devices are the first and second ion propulsion systems 50, 60.

In some implementations, each power supply 20, 30 can include a power source, such as a battery (e.g., a solar-powered battery), and a power controller that controls the supply of power from the power source to the rotary switch assembly 40. The first and second power supplies 20, 30 can be operated independently of each other so as to be considered redundant.

The first and second ion propulsion systems 50, 60 each can be any of various ion propulsion systems known in the art, such as ion propulsion systems that use gridded thrusters, ion propulsion systems that use Hall effect thrusters, and the like. For example, according to some implementations, each of the ion propulsion systems 50, 60 can be a xenon (or other ionizable gas) ion propulsion system for providing thrust for station keeping and transfer of orbit of satellites. Generally, the first and second ion propulsion systems 50, 60 utilize power from one or both of the first and second power supplies 20, 30 to generate propulsion by accelerating charged ions from the gas. In some implementations, the first and second ion propulsion systems 50, 60, or ion thrusters, include an ion extraction assembly, a housing which forms an ionization chamber, a discharge electron source and an electrode system which are positioned within the chamber, a magnetic field generator, which is also positioned within the chamber, and a neutralizer positioned adjacent the ion extraction assembly.

In a basic operation of an ion propulsion system, the ionizable gas is supplied to the chamber via a valve and primary electrons are injected into the gas from the electron source. A discharge voltage applied to the electrode system accelerates these electrons into collisions with gas atoms to generate a plasma. The magnetic field generator typically includes annular permanent magnets and is configured to develop magnetic flux lines proximate to the housing. The magnetic flux lines direct electrons along extended paths, and thus enhance the generation of the plasma. The ion extraction assembly has a screen grid, an accelerator grid, and a decelerator grid. Electrical power from the power supply system is applied to the grids to cause the ion extraction assembly to extract an ion beam from the plasma and accelerate it away from the thruster. The ion beam generates a force upon the ion thruster and spacecraft to which it is attached. Finally, the neutralizer injects an electron stream into the proximity of the ion beam to offset potential charge-depleting effects of the ion beam. The first and second ion propulsion systems 50, 60 can be operated independently of each other so as to be considered redundant.

Although the propulsion systems 50, 60 of the illustrated embodiments are described as ion propulsion systems, in other embodiments, other types of electrical propulsion systems, or even chemical propulsion systems can be used. Similarly, although in the illustrated embodiments, the electrical devices receiving power from the power supplies are propulsion systems, in other embodiments, the electrical devices can be any of various other electrical devices. Moreover, although the system of the illustrated embodiments includes two power supplies and two ion propulsion systems, in other embodiments, the system can include more than two power supplies and/or propulsion systems, or fewer than two power supplies and/or propulsion systems.

Referring to FIG. 1, the operation of the rotary switch assembly 40 is shown generally. In one embodiment, the rotary switch assembly 40 is selectively operable, and switchable between, three modes of operation. In a first mode of operation, the rotary switch assembly 40 supplies power from the first power supply 20 to the first ion propulsion system 50 via a first electrical circuit 70A defined by the rotary switch assembly, and separately supplies power from the second power supply 30 to the second ion propulsion system 60 via a separate second electrical circuit 70B defined by the rotary switch assembly. In contrast, in the second mode of operation, the rotary switch assembly 40 supplies power from the first power supply 20 to the second ion propulsion system 60 via a third electrical circuit 80A defined by the rotary switch assembly, and separately supplies power from the second power supply 30 to the first ion propulsion system 50 via a fourth electrical circuit 80B defined by the rotary switch assembly. Finally, in the third mode of operation, the first and second ion propulsion systems 50, 60 are electrically isolated from (e.g., do not receive power from) the first and second power supplies 20, 30.

According to some implementations, the rotary switch assembly 40 may be selectively switched between the first and second modes based on the inoperability of one or more of the first and second power supplies 20, 30 and/or the first and second ion propulsion systems 50, 60. For example, should the first ion propulsion system 50 become disabled, and power is desirably supplied from the first power supply 20 for any of various reasons, the rotary switch assembly 40 can be switched from the first mode to the second mode. Similarly, in another example, should operation of the first ion propulsion system 50 be desired, and the first power supply 20 become disabled, the rotary switch assembly 40 can be switched from the first mode to the second mode.

Figure 2:
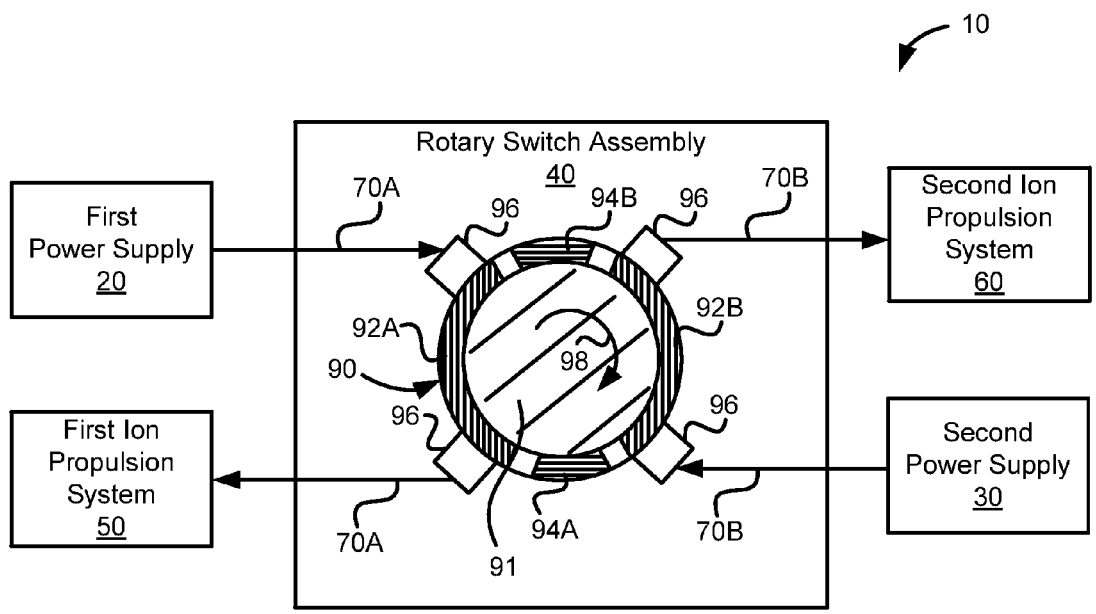
FIG. 2 is a schematic block diagram of an electrical system with a rotary switch according to another embodiment showing a shaft assembly of the rotary switch in a first mode of operation.

According to a specific embodiment shown in FIG. 2, the rotary switch assembly 40 includes a shaft assembly 90 that is rotatable to switch between the first and second modes of operation. The shaft assembly 90 includes a cylindrical shaft 91, two conductive ring segments 92A, 92B, and two non-conductive ring segments 94A, 94B (e.g., isolation pads). The two conductive ring segments 92A, 92B and two non-conductive ring segments 94A, 94B are coupled to an outer surface of the shaft 91. The conductive ring segments 92A, 92B are positioned on opposing sides of the shaft 91. Similarly, the non-conductive ring segments 94A, 94B are positioned on opposing sides of the shaft 91, and between the conductive ring segments 92A, 92B. The shaft 91 and non-conductive ring segments 94A, 94B are made from an electrically non-conductive or insulative material, such as polymeric and composite materials. The conductive ring segments 92A, 92B are made from an electrically conductive material, such as copper, aluminum, and silver.

The rotary switch assembly 40 also includes a plurality of electrical contacts 96 positioned about the shaft assembly 90. The contacts 96 can be any of various electrical contacts, such as brush contacts. The position of the electrical contacts 96 relative to the shaft assembly 90 permits physical contact with the ring segments 92A, 92B, 94A, 94B. Additionally, the electrical contacts 96 are fixed relative to the shaft assembly 90 such that as the shaft assembly rotates, the electrical contacts remain stationary relative to the rotating shaft assembly. As the shaft assembly 90 rotates, the electrical contacts 96 remain in contact with at least one of the ring segments 92A, 92B, 94A, 94B. For example, in some implementations, the electrical contacts 96 slide along the ring segments 92A, 92B, 94A, 94B as the shaft assembly 90 rotates. The electrical contacts 96 are spaced evenly apart about the shaft assembly 90. Further, the electrical contacts 96 are electrically coupled to a respective one of a plurality of electrical leads. Each electrical lead is electrically coupled to one of the first power supply 20, second power supply 30, first ion propulsion system 50, and second ion propulsion system 60. In certain implementations, the shaft assembly 90 can be rotated via a motor, such as a stepper motor.

Each of the electrical circuits 70A, 70B, 80A, 80B is formed from a combination of one of the conductive ring segments 92A, 92B, two of the electrical contacts 96, and two of the electrical leads. More specifically, each electrical circuit 70A, 70B, 80A, 80B includes the electrical lead and contact coupled to one of the power supplies 20, 30, the electrical lead and contact coupled to one of the ion propulsion systems 50, 60, and the conductive ring segment 92 in contact with both of these contacts. Referring again to FIG. 2, in the first mode, the rotational position of the shaft assembly 90 is such that the first electrical circuit 70A is formed between the first power supply 20 and the first ion propulsion system 50 via a set of two leads and two electrical contacts 96 in contact with the conductive ring segment 92A. Also, in the first mode, the shaft assembly 90 is positioned such that the second electrical circuit 70B is formed between the second power supply 30 and the second ion propulsion system 60 via a set of two other leads and two other electrical contacts 96 in contact with the conductive ring segment 92B.

Figure 3:
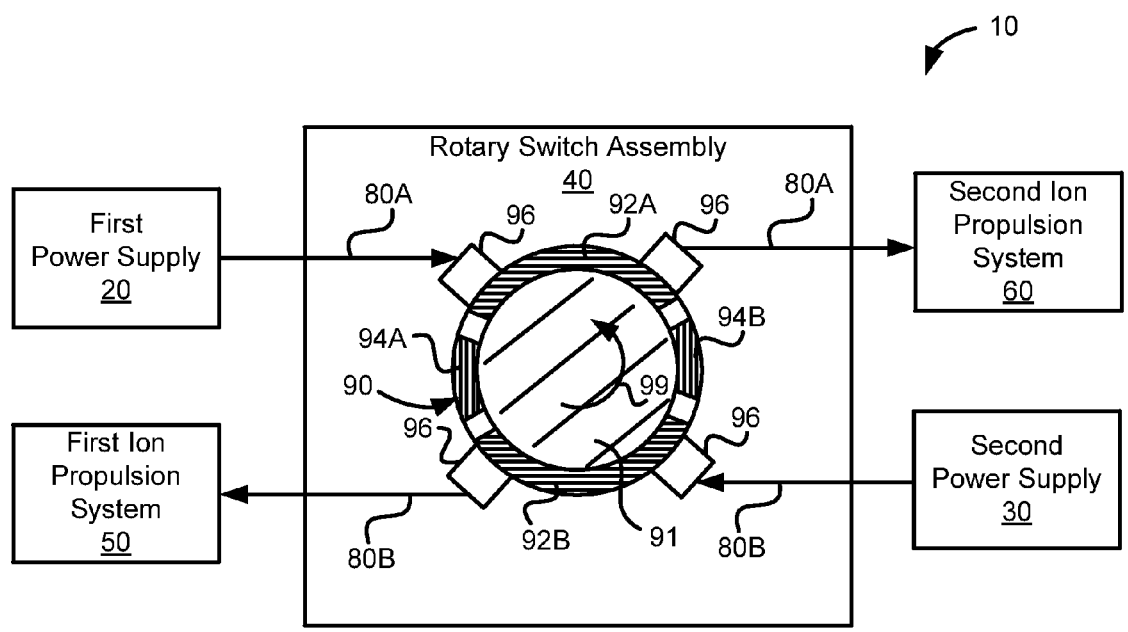
FIG. 3 is a schematic block diagram of the electrical system of FIG. 2 shown with the shaft assembly of the rotary switch in a second mode of operation.

From the first mode, the rotary switch assembly 40 can be switched into the second mode by rotating the shaft assembly 90. In one implementation, the shaft assembly 90 can be rotated 90-degrees in a first direction 98 to switch from the first mode to the second mode. Referring to FIG. 3, in the second mode, the rotational position of the shaft assembly 90 is such that the third electrical circuit 80A is formed between the first power supply 20 and the second ion propulsion system 60 via a set of two leads and two electrical contacts 96 in contact with the conductive ring segment 92A. Also, in the second mode, the shaft assembly 90 is positioned such that the fourth electrical circuit 80B is formed between the second power supply 30 and the first ion propulsion system 50 via a set of two other leads and two other electrical contacts 96 in contact with the conductive ring segment 92B. The rotary switch assembly 40 can be switched back into the first mode by rotating the shaft assembly 90 90-degrees in a second direction 99 that is opposite the first direction 98. Although the shaft assembly 90 is shown being rotatable 90-degrees in certain directions to switch modes, in other embodiments, the shaft assembly can be rotatable in other directions and/or more than 90 degrees (e.g., 270-degrees).

Although not shown, the non-conductive ring segments 94A, 94B act to isolate the conductive ring segments 92A, 92B from each other. Additionally, shaft assembly 90 can be rotated to place the electrical contacts 96 on the non-conductive ring segments 94A, 94B to effectively isolate a circuit.

Referring to FIGS. 4-7, one embodiment of a shaft assembly 100 is shown. The shaft assembly 100 can form part of a rotary switch assembly, such as rotary switch assembly 40. Further, the shaft assembly 100 may be rotatable as described above to switch between operational modes of the rotary switch assembly. The shaft assembly 100 includes a cylindrical shaft 102 that extends from a first end portion 142 to a second end portion 144 (see, e.g., FIG. 5). The cylindrical shaft 102 rotates about a central axis 108 of the shaft. Between the first and second end portions 142, 144 are a plurality of circumferential grooves 120 formed into the outer surface of the cylindrical shaft 102. The grooves 120 are spaced-apart axially along a length of the cylindrical shaft 102. Each circumferential groove 120 is positioned between two circumferential baffles 122 or partitions also formed in the outer surface of the cylindrical shaft 102. Like the grooves 120, the baffles 122 are spaced-apart axially along a length of the cylindrical shaft 102. Generally, the grooves 120 define recessed portions of the cylindrical shaft 102 and the baffles 122 define raised portions of the cylindrical shaft. Although the outer periphery of the shaft 102 includes grooves 120 and baffles 122, the shaft 102 is considered a cylindrical shaft because each cross-section perpendicular to the central axis 108 and taken along a length of the shaft has a generally circular shape. Additionally, in certain embodiments, the shaft 102 is considered a cylindrical shaft because the shaft is elongate in a direction parallel to the central axis 108.

The cylindrical shaft 102 is made from an electrically non-conductive material, such as polymeric and composite materials. In one embodiment, the shaft 102 is made from a hardened plastic. In one embodiment, the cylindrical shaft 102 is formed using a mold and casting technique. For example, molten material may be poured into a pre-fabricated mold and allowed to harden. However, for more precise control of the dimensions, tolerances, and material composition of the cylindrical shaft 102, the shaft is formed by machining the shaft out of a single piece or ingot of non-conductive material. The single piece of non-conductive material can be prepared using any of various techniques. According to one implementation, the material is heated to temperatures beyond the melting temperature of the conductive materials of the shaft assembly 100. Such extreme temperatures facilitate the homogeneity of the material that would otherwise not be practical for conventional methods of casting the shaft with the conductive materials in place. Various machining techniques and equipment can be used to machine the single piece of non-conductive material, such as CNC and non-CNC mills, lathes, presses, wire EDM machines, stereolithography machines, and the like. Because the cylindrical shaft 102 is machined from a single piece of non-conductive material, the shaft forms a one-piece monolithic construction.

Figure 4:
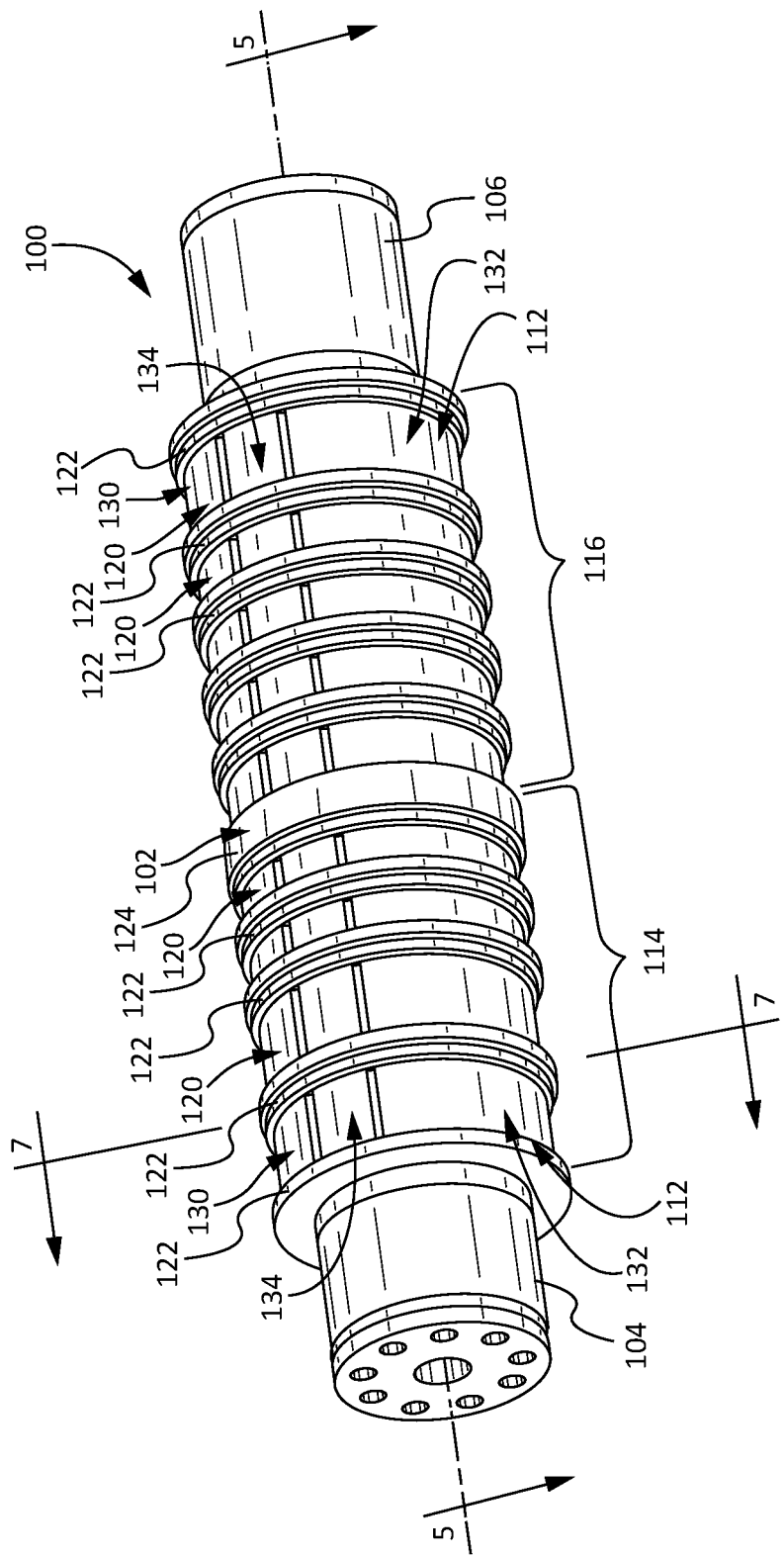
FIG. 4 is a perspective view of a shaft assembly of a rotary switch according to one embodiment.
Figure 7:
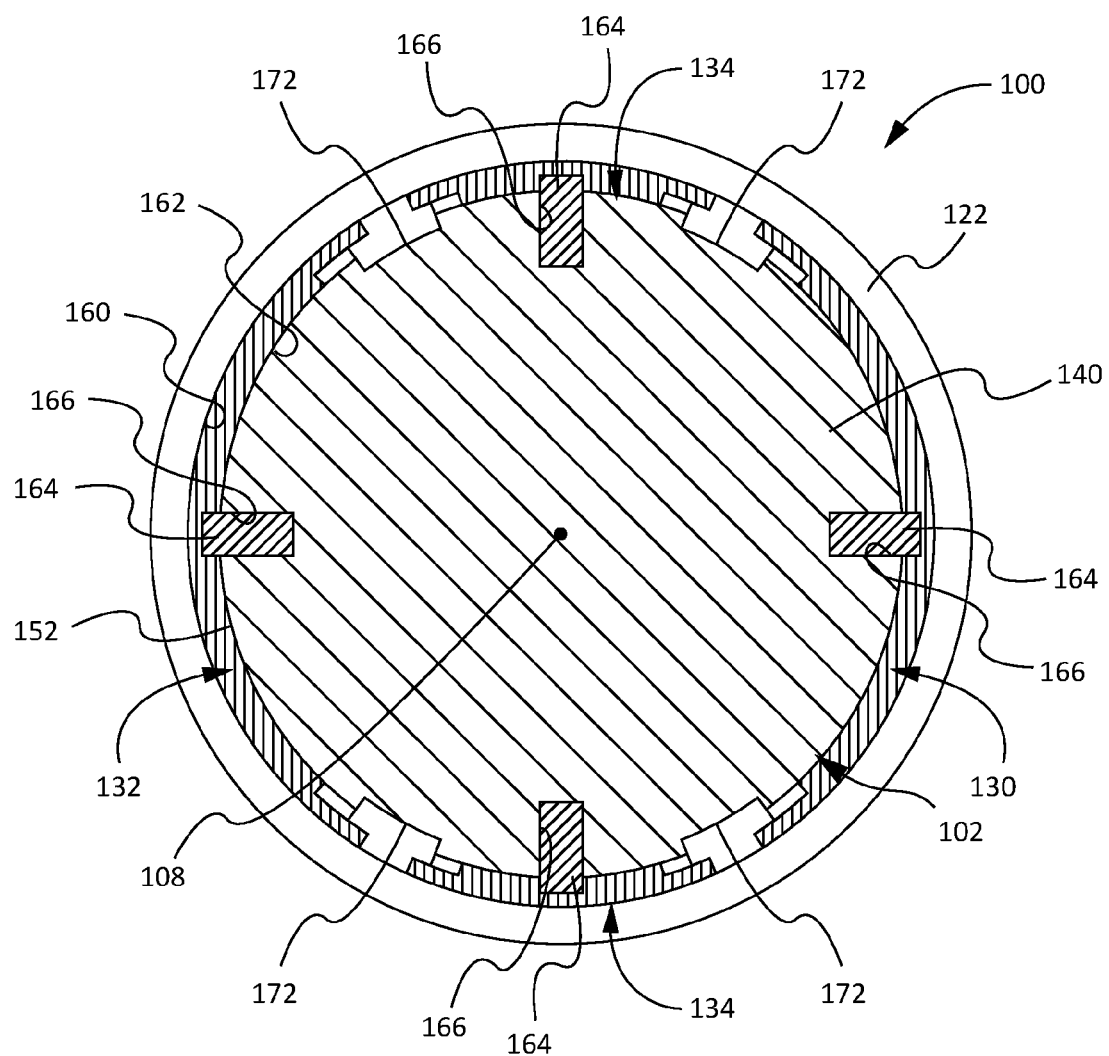
FIG. 7 is a cross-sectional end view of the shaft assembly of FIG. 4 taken along the line 7-7 of FIG. 4.

The shaft assembly 100 also includes a plurality of contact rings 112 each positioned within a respective one of the circumferential grooves 120. Each contact ring 112 includes at least one conductive ring segment made from an electrically conductive material. The at least one conductive ring segment forms at least a portion of the contact ring 112. In the illustrated embodiment, each contact ring 112 includes a plurality of circumferentially-spaced ring segments. For example, as shown, each contact ring 112 includes a first conductive ring segment 130, a second conductive ring segment 132, and two non-conductive ring segments 134. The non-conductive ring segments 134 are made from a non-conductive material. Referring to FIGS. 4 and 7, the first and second conductive ring segments 130, 132 are circumferentially spaced apart from each other on opposing sides of the shaft 102. The two non-conductive ring segments 134 also are circumferentially spaced apart from each other on opposing sides of the shaft 102 between the conductive ring segments 130, 132. According to some embodiments, the conductive ring segments 130, 132 of each contact ring 112 are configured the same (e.g., same arcuate length, width, and thickness). Likewise, the non-conductive ring segments 134 of each contact ring 112 are configured the same. As shown in FIGS. 4 and 7, each ring segment of each contact ring 112 is circumferentially spaced apart from the adjacent ring segment, such that a circumferential spatial gap is defined between each ring segment of a contact ring.

The conductive and non-conductive ring segments 130, 132, 134 are formed separately from each other and the cylindrical shaft 102. In some embodiments, each ring segment is made using a machining technique. For example, each ring segment can be machined from a single piece of material. As with the cylindrical shaft 102, the ring segments 130, 132, 134 are machined in some embodiments for more precise control of the dimensions, tolerances, and material composition of the ring segments. Despite the advantages of machining the ring segments, according to certain embodiments, each ring segment can be made using a molding or casting technique.

After the cylindrical shaft 102 and ring segments 130, 132, 134 are made, the ring segments of each contact ring 112 are bonded to the shaft within a respective groove 120. The ring segments 130, 132, 134 can be bonded using a bonding adhesive 170 positioned between the groove 120 and the ring segments (see, e.g., FIG. 6). The layer of bonding adhesive 170 is first applied into the groove 120, and the ring segments 130, 132, 134 are then placed in the groove against the bonding adhesive. The size and shape of the ring segments 130, 132, 134 relative to the size and shape of the groove 120 are configured to ensure a predetermined and predictable uniform bond-line thickness or gap t between the ring segments and groove along the entire mating surfaces of the ring segments and groove. According to some embodiments, the bonding adhesive 170 includes a mixture of an adhesive (e.g., epoxy) and bond-line control beads. The bond-line control beads can be made from a rigid material, such as glass, plastic, and the like, and have a uniform diameter.

Generally, the groove 120 and ring segments 130, 132, 134 are machined such that the uniform gap t is substantially equal to the diameter of the bond-line control beads. Accordingly, the groove 120 and ring segments 130, 132, 134 are machined to have the same general cross-sectional shape, with the ring segments having a slightly smaller cross-sectional size. In this manner, a uniform gap t can be formed between the groove 120 and ring segments 130, 132, 134 along the entire mating or opposing surfaces (e.g., bond line) of the groove and ring segments. With the uniform gap t along the bond line between the groove 120 and ring segments 130, 132, 134 being substantially equal to the bond-line control beads, a uniform bond-line thickness between the groove and ring segments is ensured via engagement between the bond-line control beads and the mating surfaces. In other words, with the bonding adhesive in place, firmly pressing the ring segments 130, 132, 134 radially inwardly into the groove 120 until further radially inward movement is prevented ensures engagement with the bond-line control beads and a uniform bond-line thickness. Controlling the bond-line thickness in this manner helps to reduce the occurrence of air gaps and voids, which can affect the strength and effectiveness of the bond.

Figure 5:
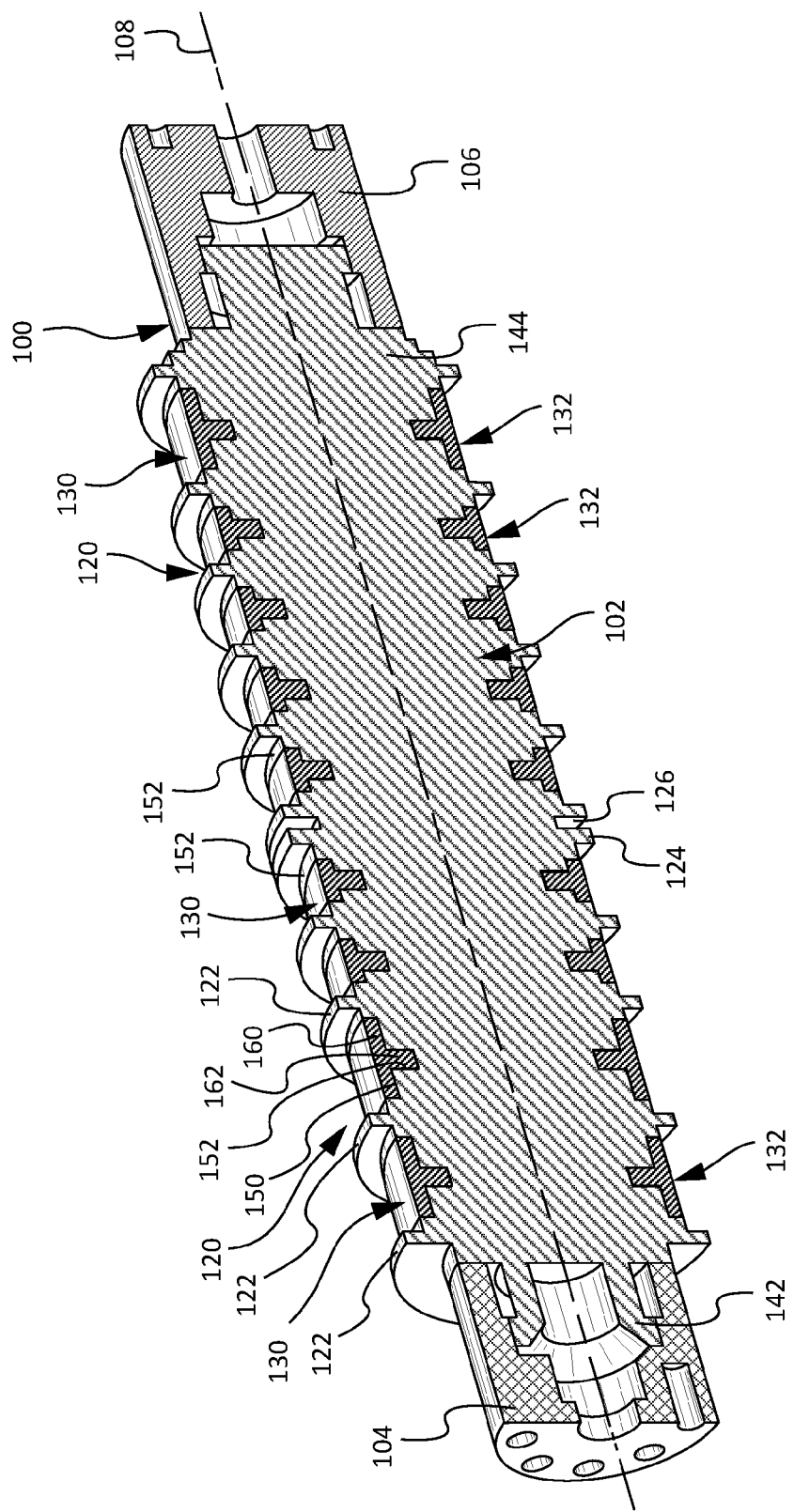
FIG. 5 is a cross-sectional perspective view of the shaft assembly of FIG. 4 taken along the line 5-5 of FIG. 4.
Figure 6:
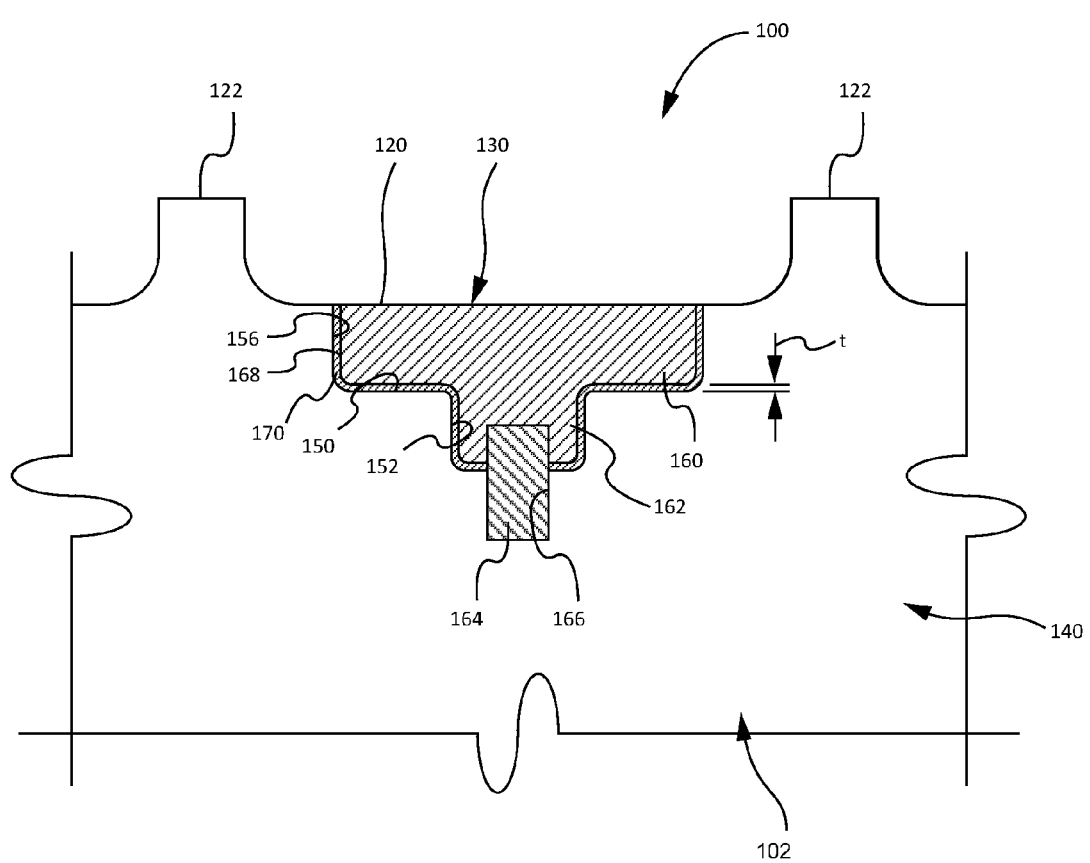
FIG. 6 is a cross-sectional side view of a portion of the shaft assembly of FIG. 4.

The grooves 120 and ring segments 130, 132, 134 have cross-sectional shapes that facilitate proper axial alignment of the contact rings 112 within a respective groove. Referring to FIGS. 5 and 6, each of the grooves 120 and ring segments 130, 132, 134 have a generally T-shaped cross-section taken along a plane extending parallel to the central axis 108. More specifically, each of the grooves 120 and ring segments 130, 132, 134 include respective radially outer portions 150, 160 and radially inner portions 152, 162 that extend transversely away from the radially outer portions.

The grooves 120 extend circumferentially about at least a substantial portion of the circumference of the shaft 102. In some embodiments, each groove 120 forms a continuous annular groove. However, in certain embodiments, each groove 120 is divided into two or more groove segments by axial slots 172 formed into the shafts 102 and traversing the groove 120 (see, e.g., FIG. 7). As shown in FIG. 6, the radially outer portion 150 of each groove 120 is a space or recess extending circumferentially about a radially outward portion of the shaft 102. The radially inner portion 152 of each groove 120 then is a space or recess that extends circumferentially about a portion of the shaft that is contiguous with but radially inward of the radially outer portion 150. Further defined in terms of its cross-sectional shape (see, e.g., FIG. 6), the radially outer portion 150 of each groove 120 is elongate in an axial direction, and the radially inner portion 152 is elongate in a radial direction, which is transverse relative to the axial direction, and extends radially inwardly away from the radially outer portion 150. The radially inner portion 152 extends along an approximate middle of the radially outer portion 150 as defined between two opposing sides 156 of the radially outer portion 150 of the groove 120. Also, as shown, in the axial direction, a width of the radially inner portion 152 is substantially smaller than a width of the radially outer portion 150.

Each ring segment 130, 132, 134 has an arcuate shape with a radius of curvature corresponding with the diameter of a corresponding portion of the groove 120. The ring segments 130, 132, 134 are defined as segments because each segment individually does not form a continuous annular ring, but rather each segment forms just a disparate segment or portion of a hypothetical annular ring. The arcuate or circumferential length of each ring segment 130, 132, 134 can vary based on the particular demands of a system. However, in one embodiment, the conductive ring segments 130, 132 have a longer circumferential length than the non-conductive ring segments 134. For example, the conductive ring segments 130, 132 can be longer than a quarter of the circumference of the shaft 102, and the non-conductive ring segments 134 can be shorter than a quarter of the circumference of the shaft.

Figure 8:
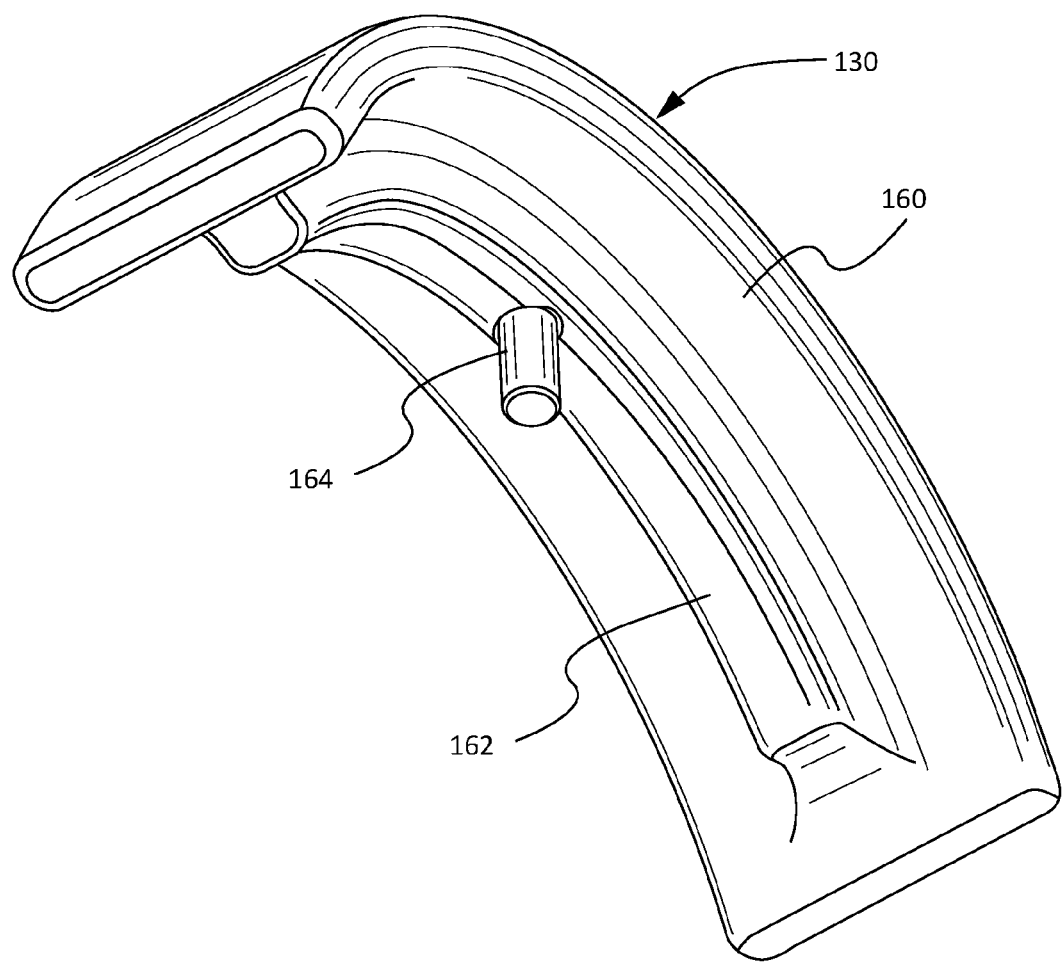
FIG. 8 is a perspective view of a conductive ring segment of a shaft assembly according to one embodiment.

The radially outer portion 160 of each ring segment 130, 132, 134 includes ring-like element with an axially flat surface and a circumferentially curved surface. The radially outer portion 160 extends partially circumferentially about a radially outward portion of the shaft 102. The radially inner portion 162 of each ring segment 130, 132, 134 is a ring-like element that extends circumferentially about at least a portion of the circumferential length of the ring segment and radially inwardly away from the radially outer portion 160 (see, e.g., FIG. 8). In some embodiments, the circumferential length of the radially inner portion 162 is shorter than the circumferential length of the radially outer portion 160. Further defined in terms of its cross-sectional shape (see, e.g., FIG. 6), the radially outer portion 160 of each ring segment 130, 132, 134 is elongate in an axial direction, and the radially inner portion 162 is elongate in a radial direction and extends radially inwardly away from the radially outer portion 160. The radially inner portion 162 extends along an approximate middle of the radially outer portion 160 as defined between two opposing sides 168 of the radially outer portion 160 of the ring segment 130. Also, as shown, in the axial direction, a width of the radially inner portion 162 is substantially smaller than a width of the radially outer portion 160.

Engagement, via the bonding adhesive 170, between the radially inner portion 152 of the groove 120 and the radially inner portion 162 of the ring segment 130 (e.g., orthogonal sides of the radially inner portions) axially aligns the ring segment within the groove. Axial alignment is alignment in a direction parallel to the central axis 108 of the shaft 102. Generally, engagement between the radially inner portion 152 of the groove 120 and the radially inner portion 162 of the ring segment 130 centers the ring segment within the groove. In this manner, the ring segment 130 axially self-aligns with the groove 120. Additional axial self-alignment can be accomplished through engagement, via the bonding adhesive 170, between the opposing sides 156 (e.g., orthogonal sides) of the radially outer portion 150 of the groove 120 and the orthogonal sides 168 of the radially outer portion 160 of the ring segment 130 (see, e.g., FIG. 6).

In some embodiments, the ring segment 130 circumferentially self-aligns with the groove 120 to ensure that proper and reliable circumferential placement of the ring segment in the groove. For example, referring to FIGS. 7 and 8, each groove 120 can include a plurality of pin receptacles 166 formed in the groove, and each ring segment 130, 132, 134 of a contact ring 112 can include a pin 164 configured to engage a respective pin receptacle. Each pin receptacle 166 extends radially inwardly from the radially inner portion 152 of the groove 120. Accordingly, the pin receptacles 166 are accessible through the groove 120. Similarly, each pin 164 is coupled to and extends radially inwardly from the radially inner portion 162 of the corresponding ring segment. The pins 164 can be coupled to the ring segments using any of various techniques. In one implementation, the pins 164 inserted into corresponding holes formed in the ring segments and bonded in place. In other implementations, the pins 164 are cast, molded, or machined into the ring segments.

The pin receptacles 166 are spaced apart circumferentially along the groove 120, and the circumferential positions of the pin receptacles 166 along each groove 120 are strategically selected according to the desired circumferential placement of the ring segments 130, 132, 134 relative to each other and the position of the pins 164 on the ring segments. In the illustrated embodiment, the shaft assembly 100 includes four pin receptacles (one for each ring segment) equally spaced about the circumference of the groove 120. Further, in the illustrated embodiment, each pin 164 is positioned in the circumferential center of the respective ring segment. During assembly, the pins 164 of the conductive ring segments 132 are inserted into opposing pin receptacles 166 (e.g., pin receptacles on opposite sides of the shaft 102, and the pins of the non-conductive ring segments 134 are inserted into the remaining pin receptacles. With the pins 164 inserted into corresponding pin receptacles 166 in this manner, the desired relative placement of the ring segments circumferentially on a groove 120 is ensured.

In some embodiments, the pins 164 may be tubes with a hollow interior channel. The application of the bonding adhesive 170 into the groove 120 may result in bonding adhesive filling the pin receptacles 166. To reduce the occurrence of voids or air pockets between the pins 164 and receptacles 166, the hollow interior channels of the pins 164 allows excess air to enter the channels rather than becoming trapped between the pins and receptacles.

Although in the illustrated embodiments each ring segment has one pin 164 positioned in the center of the ring segments, in other embodiments, each ring segment can have more than one pin 164 in various positions (e.g., proximate ends of the segments) or one pin in a non-centered position, and the shaft 102 can have additional receptacles 166 to accommodate the additional and variously positioned pins or a single receptacle in a non-centered position. Also, instead of the pin being coupled to the ring segments and the receptacles being formed in the shaft, in some embodiments, the pins can be coupled to the shaft and the receptacles can be formed in the ring segments.

Figure 9:
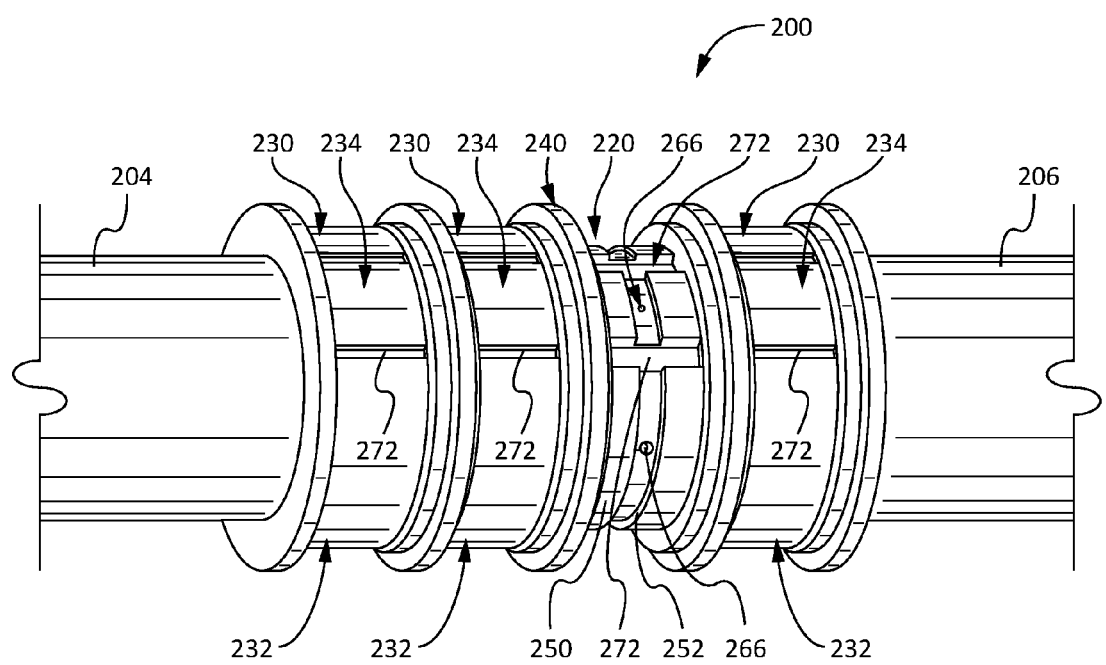
FIG. 9 is a perspective view of a shaft assembly of a rotary switch according to another embodiment.

Referring to FIGS. 7 and 9, axial slots can be formed in the shaft that extends into and through the radially inner portion of the groove to accommodate adhesive bonding overflow. As shown in FIG. 9, the axial slot 272 of the shaft assembly 200, which includes features analogous to the features of the shaft assembly 100 with like numbers referring to like features, extends axially from one side of the groove 220 to an opposing side of the groove. As shown in FIG. 7, the axial slots 172 may have a depth that is deeper than the radially inner portion 152 of the groove 120. Additionally, the axial slots 172 are positioned to extend circumferentially between adjacent ring segments. Accordingly, the shaft may include a number of axial slots equal to the number of ring segments (e.g., four axial slots in the illustrated embodiments). In some embodiments, end portions of the radially outer portions 160 of the ring segments may overhang or overlap the axial slots 172 as shown in FIG. 7. It is noted that the axial slots 172 are machined or formed prior to the ring segments being bonded to the grooves.

Again referring to FIGS. 4 and 5, the shaft assembly 100 include first and second end caps 104, 106 coupled to respective end portions 142, 144 of the shaft 102. The first and second end caps 104, 106 are bonded to the respective end portions 142, 144 using a bonding adhesive in some embodiments. In other embodiments, the first and second end caps 104, 106 are fastened to the respective end portions 142, 144. The first and second end caps 104, 106 are configured to engage and rotate on bearings (not shown). Additionally, at least one of the first and second end caps 104, 106 is coupled to and driven by a driver, such as a stepper motor, that rotates the shaft assembly 100. In one embodiment, the first and second end caps 104, 106 are made from a metal, such as aluminum. In yet other embodiments, the first and second end caps 104, 106 can be made from a hard and rigid non-metal material, such as a plastic and composite.

Referring back to FIGS. 4 and 5, the shaft assembly 100 includes a high voltage section 114 and a low voltage section 116. The high voltage section 114 includes some of the contact rings 112 of the shaft assembly 100 and the low voltage section 116 includes the other contact rings 112. In the illustrated embodiment, the shaft assembly 100 includes a high voltage section 114 with four contact rings 112, and a low voltage section 116 with five contact rings. In other embodiments, each of the high and low voltage sections 114, 116 can have fewer or more than four contact rings 112. Generally, the contact rings 112 of the high voltage section 114 are configured to receive and transmit electrical power at a first voltage and the contact rings of the low voltage section 116 are configured to receive and transmit electrical power at a second voltage that is lower than the first voltage.

The contact rings 112 of each of the high and low voltage sections 114, 116 are divided by baffles 122 as described above. Each of the baffles 122 has a first axial width. In contrast, the high and low voltage sections 114, 116 are divided or separated by a dividing baffle 124 that has a second axial width larger than the first axial width. The dividing baffle 124 is necessary to reduce the risk of arcing between the high and low voltage sections 114, 116. Referring to FIG. 5, in some embodiments, the dividing baffle 124 between the high and low voltage sections 114, 116 may include a circumferential slot 126 formed in an outer surface of the dividing baffle 124 to improve the arc-reducing characteristics of the dividing baffle 124. Although the shaft assembly 100 includes high and low voltage sections, as shown in FIG. 9, in some embodiments, shaft assemblies, such as the shaft assembly 200, do not have high and low voltage sections.

Figure 10:
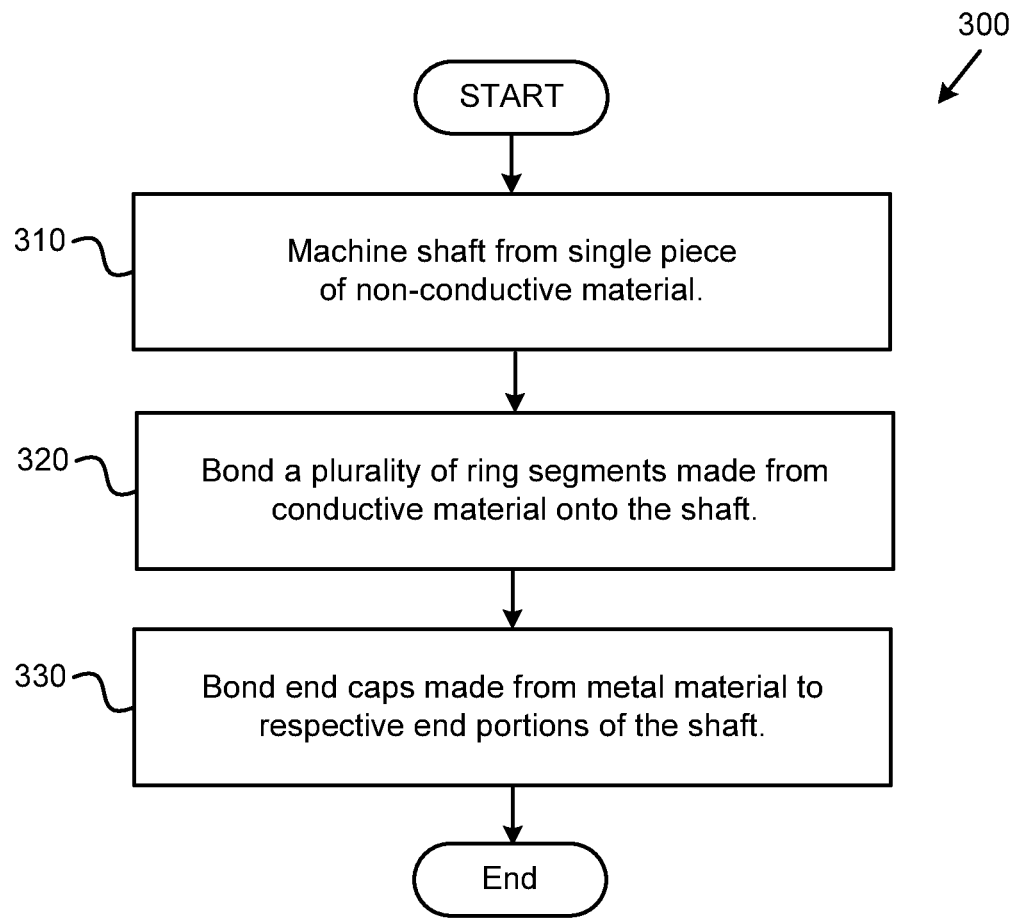
FIG. 10 is a schematic flow diagram of a method for making a shaft assembly for a rotary switch according to one embodiment.

Referring to FIG. 10, one embodiment of a method 300 for making a shaft assembly for a rotary switch is shown. The method 300 includes machining a shaft from a single piece or ingot of non-conductive material at 310. Additionally, the method 300 includes bonding a plurality of ring segments made from a conductive material onto the shaft at 320. Prior to bonding the ring segments, the ring segments can be made to have a T-shaped cross-section. Also, the ring segments can be made to have a pin coupled thereto. In one implementation, machining the shaft at 310 includes forming at least one groove into the shaft, and bonding the plurality of ring segments at 320 includes bonding the ring segments to the groove. Bonding the ring segments at 320 may also include applying a bonding adhesive into the groove, which can be formed to have a T-shaped cross-section. Further, bonding may include positioning the ring segments in the groove such that a gap with a uniform thickness is defined between the ring segments and the groove. The groove can be formed to have holes into which pins coupled to the ring segments can be inserted. In some instances, bonding the ring segments onto the shaft includes positioning the ring segments in a groove formed in the shaft such that the ring segments circumferentially and axially self-align relative to the groove. Axial self-alignment may be facilitated by vertical portions of T-shaped ring segments and a T-shaped groove, and circumferential self-alignment may be facilitated by engagement between pins coupled to the ring segments and holes formed in the groove. The method 300 also includes bonding end caps made from a durable material, such as metal, to respective end portions of the shaft at 330.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A shaft assembly for a rotary switch of a propulsion system, comprising:
   a shaft of the rotary switch, wherein the shaft is made from an electrically non-conductive material, the shaft comprising at least one circumferential groove having a T-shaped cross-section;
   at least one conductive ring segment made from an electrically conductive material positioned within the circumferential groove, the conductive ring segment having the T-shaped cross-section; and
   a bonding adhesive positioned between the circumferential groove and the conductive ring segment.

2. The shaft assembly of claim 1, further comprising at least one non-conductive ring segment made from an electrically non-conductive material, the non-conductive ring segment being positioned within the circumferential groove and having the T-shaped cross-section, wherein the bonding adhesive is positioned between the circumferential groove and the non-conductive ring segment.

3. The shaft assembly of claim 2, wherein the conductive ring segment and the non-conductive ring segment are circumferentially spaced apart from each other.

4. The shaft assembly of claim 2, wherein:
   the conductive ring segment is a first conductive ring segment, the shaft assembly further comprising a second conductive ring segment positioned within the circumferential groove and having the T-shaped cross-section;
   the non-conductive ring segment is a first non-conductive ring segment, the shaft assembly further comprising a second non-conductive ring segment positioned within the circumferential groove and having the T-shaped cross-section; and
   the first and second non-conductive rings being positioned between the first and second conductive ring segments on substantially opposing sides of the shaft.

5. The shaft assembly of claim 2, wherein the shaft further comprises an axial slot extending transversely through the circumferential groove.

6. The shaft assembly of claim 5, wherein the axial slot is positioned between the conductive ring segment and the non-conductive ring segment.

7. The shaft assembly of claim 1, wherein the shaft further comprises a first pin receptacle formed in the circumferential groove, and wherein the conductive ring segment comprises a pin configured to engage the first pin receptacle to circumferentially align the conductive ring segment within the circumferential groove.

8. The shaft assembly of claim 7, further comprising at least one non-conductive ring segment made from an electrically non-conductive material, the non-conductive ring segment being positioned within the circumferential groove and having the T-shaped cross-section, wherein the bonding adhesive is positioned between the circumferential groove and the non-conductive ring segment, and wherein the shaft further comprises a second pin receptacle formed in the circumferential groove, and wherein the non-conductive ring segment comprises a pin configured to engage the second pin receptacle to circumferentially align the non-conductive ring segment in a spaced-apart manner relative to the conductive ring segment.

9. The shaft assembly of claim 1, wherein the shaft is made solely from the electrically non-conductive material to form a one-piece monolithic construction.

10. The shaft assembly of claim 1, wherein the shaft is machined from the electrically non-conductive material.

11. The shaft assembly of claim 1, wherein:
    the conductive ring segment comprises a radially outer portion and a radially inner portion extending transversely away from the radially outer portion in a radially inward direction to define the T-shaped cross-section of the circumferential groove;
    the circumferential groove comprising a radially outer portion and a radially inner portion extending transversely away from the radially outer portion of the circumferential groove to define the T-shaped cross-section of the circumferential groove; and
    the radially outer portion of the conductive ring segment being positioned within the radially outer portion of the circumferential groove and the radially inner portion of the conductive ring segment being positioned within the radially inner portion of the circumferential groove.

12. The shaft assembly of claim 1, wherein a gap having a uniform thickness is defined between the circumferential groove and the conductive ring segment.

13. The shaft assembly of claim 12, wherein:
    the bonding adhesive comprises bond-line control beads; and
    the uniform thickness of the gap is approximately equal to a diameter of the bond-line control beads.

14. The shaft assembly of claim 1, wherein the shaft comprises a plurality of circumferential grooves spaced apart axially along the shaft, the shaft assembly comprising a plurality of conductive ring segments each positioned within a respective one of the plurality of circumferential grooves.

15. The shaft assembly of claim 14, wherein the shaft further comprises a plurality of baffles positioned between the plurality of grooves, the baffles each having a diameter greater than respective diameters of adjacent grooves.

16. The shaft assembly of claim 15, wherein a first number of the plurality of conductive ring segments comprises a high voltage section of the shaft assembly, and a second number of the plurality of conductive ring segments comprises a low voltage section of the shaft assembly, and wherein a dividing baffle of the plurality of baffles divides the high voltage section and the low voltage section, the dividing baffle having an axial thickness greater than the other of the plurality of baffles.

17. The shaft assembly of claim 16, wherein the shaft further comprises a circumferential slot formed in the dividing baffle.

18. The shaft assembly of claim 1, further comprising a first end cap bonded to a first end section of the shaft and a second end cap bonded to a second end section of the shaft, the first and second end caps being made from a metal.

19. An electrical propulsion system, comprising:
a rotary switch assembly comprising first, second, third, and fourth electrical contacts and a shaft assembly, the shaft assembly comprising:
a shaft machined from an electrically non-conductive material to form a one-piece monolithic construction, the shaft comprising a circumferential groove having a T-shaped cross-section;
two conductive ring segments each made from an electrically conductive material, each conductive ring segment being adhesively bonded to the circumferential groove in a circumferentially spaced-apart manner, wherein each conductive ring segment has the T-shaped cross-section;
two non-conductive ring segments each made from an electrically non-conductive material, and each non-conductive ring segment being adhesively bonded to the circumferential groove circumferentially between the conductive ring segments, wherein each non-conductive ring segment has the T-shaped cross-section; and
wherein the first, second, third, and fourth electrical contacts are electrically contactable with the conductive ring segments and the non-conductive ring segments via rotation of the shaft; a first power supply providing power to the first electrical contact of the rotary switch assembly;
a second power supply providing power to the second electrical contact of the rotary switch assembly;
a first propulsion system receiving power from the third electrical contact of the rotary switch assembly; and
a second propulsion system receiving power from the fourth electrical contact of the rotary switch assembly;
wherein the shaft of the rotary switch assembly is rotatable to switch between first and second modes, wherein in the first mode, the rotary switch transmits electrical power from the first power supply to the first propulsion system and transmits electrical power from the second power supply to the second propulsion system, and in the second mode, the rotary switch transmits electrical power from the first power supply to the second propulsion system and transmits electrical power from the second power supply to the first propulsion system.

20. The electrical propulsion system of claim 19, further comprising a spacecraft, wherein the rotary switch assembly, first power supply, second power supply, first propulsion system, and second propulsion system are coupled to the spacecraft.

21. A method for making a shaft assembly for a rotary switch of a propulsion system, comprising:
forming a shaft of the rotary switch, wherein the shaft is made from an electrically non-conductive material, the shaft comprising a circumferential groove having a T-shaped cross-section; forming a conductive ring segment made from an electrically conductive material, the conductive ring segment having the T-shaped cross-section; applying a bonding adhesive into the circumferential groove; and positioning the conductive ring segment into the circumferential groove against the bonding adhesive.

22. The method of claim 21, wherein forming the shaft comprises machining the shaft from a single ingot of electrically non-conductive material.

23. The method of claim 21, wherein positioning the conductive ring segment into the groove comprises defining a uniformly thick gap between the conductive ring segment and the circumferential groove.

24. The method of claim 21, wherein forming the shaft comprises forming a hole in the circumferential groove and forming the conductive ring segment comprises coupling a pin to the conductive ring segment, and wherein positioning the conductive ring segment into the circumferential groove comprises inserting the pin into the hole.

25. The method of claim 21, wherein positioning the conductive ring segment into the circumferential groove comprises circumferentially and axially self-aligning the conductive ring segment within the circumferential groove.

* * * * *